United States Patent
Hayama

(10) Patent No.: US 12,291,667 B2
(45) Date of Patent: May 6, 2025

(54) COLD AND HEAT STORAGE AGENT COMPOSITION

(71) Applicant: KYODO YUSHI CO., LTD., Fujisawa (JP)

(72) Inventor: Makoto Hayama, Fujisawa (JP)

(73) Assignee: KYODO YUSHI CO., LTD., Kanagawa (JP)

( * ) Notice: Subject to any disclaimer, the term of this patent is extended or adjusted under 35 U.S.C. 154(b) by 0 days.

(21) Appl. No.: 17/729,517

(22) Filed: Apr. 26, 2022

(65) Prior Publication Data

US 2022/0340800 A1    Oct. 27, 2022

(30) Foreign Application Priority Data

Apr. 27, 2021 (JP) ................. 2021-075008

(51) Int. Cl.
  *C09K 5/06* (2006.01)
  *C09K 5/10* (2006.01)

(52) U.S. Cl.
  CPC .............. *C09K 5/063* (2013.01); *C09K 5/10* (2013.01); *Y02E 60/14* (2013.01)

(58) Field of Classification Search
  CPC .. C09K 5/06; C09K 5/063; C09K 5/10; Y02E 60/14
  See application file for complete search history.

(56) References Cited

U.S. PATENT DOCUMENTS

| | | | |
|---|---|---|---|
| 9,663,698 B2 * | 5/2017 | Yoshinari | C09K 5/063 |
| 2009/0169893 A1 * | 7/2009 | Ikegami | C09K 5/063 428/407 |
| 2011/0056656 A1 * | 3/2011 | Ziehe | C09K 5/063 165/104.17 |
| 2015/0203734 A1 * | 7/2015 | Kanae | C09K 5/063 252/79 |
| 2016/0024364 A1 | 1/2016 | Yoshinari et al. | |
| 2020/0216737 A1 * | 7/2020 | McNeil | C09K 5/063 |

FOREIGN PATENT DOCUMENTS

| | | | | |
|---|---|---|---|---|
| CN | 104520403 A | 4/2015 | | |
| EP | 3412746 A1 * | 12/2018 | ............... | C09K 5/06 |
| JP | 2013166845 A | 8/2013 | | |
| JP | 2014095023 A | 5/2014 | | |
| JP | 2014122320 A * | 7/2014 | | |
| JP | 2015054918 A | 3/2015 | | |
| WO | 2007058003 A1 | 5/2007 | | |
| WO | WO-2013077379 A1 * | 5/2013 | ............. | C09K 5/063 |
| WO | 2014025070 A1 | 2/2014 | | |

OTHER PUBLICATIONS

Nacol Ether C12-C36 Di-n-alkyl-ethers Pamphlet (Year: 2017).*
Office Action issued on Nov. 30, 2024, by the State Intellectual Property Office of People's Republic of China in corresponding CN Application No. 202210458999.9, and English translation of the Office Action (12 pages).
Office Action issued on Oct. 7, 2024, by the Japanese Patent Office in corresponding JP Application No. 2021075008, and English translation of the Office Action (11 pages).

* cited by examiner

*Primary Examiner* — Matthew R Diaz
(74) *Attorney, Agent, or Firm* — Panitch Schwarze Belidario & Nadel LLP

(57) ABSTRACT

Provided is a cold and heat storage agent composition that does not fall into the GHS categories, the cold and heat storage agent composition comprising:
  (A) a dialkyl ether; and
  (B) a normal paraffin, wherein
  the (A) contains a dialkyl ether having a straight chain alkyl group,
  the (B) contains a normal paraffin having 16 to 20 carbon atoms, and a content of the normal paraffin having 16 to 20 carbon atoms is 3.0% by mass or more and less than 10.0% by mass based on a total mass of the composition, and
  a melting point and a freezing point of the composition measured by DSC are within a range of −13.0° C. to +12.4° C.

8 Claims, No Drawings

COLD AND HEAT STORAGE AGENT COMPOSITION

BACKGROUND OF THE INVENTION

Field of the Invention

The present invention relates to a cold and heat storage agent composition for use in a refrigeration cycle apparatus.

Description of Related Art

Vehicles having an idling stop function that automatically stops the engine when the vehicle is stopped, such as during waiting for a traffic light, have been in practical use. Such a vehicle is equipped with a vehicle air-conditioning apparatus of cold storage type which causes a cold storage to store cold while a compressor is operated, and can cool down a blow air into a vehicle cabin with a cooler while the compressor is stopped.

The vehicle air-conditioning apparatus uses a cold and heat storage agent or cold and heat storage agent composition. A water-based cold and heat storage agent or cold and heat storage agent composition has problems of corrosion and decay, and accordingly a cold and heat storage agent or cold and heat storage agent composition using a normal paraffin as a base agent in place of the water-based base agent has been developed (for example, Patent Literature 1). Normal paraffins have characteristics of exhibiting stable melting properties and freezing properties for a long period of time and having a large amount of latent heat.

However, the aspiration hazard of normal paraffins according to the GHS (Globally Harmonized System of Classification and Labeling of Chemicals) classification is Category 1 which indicates the highest hazardousness among the five categories. Among normal paraffins, normal dodecane (n-C12) has a flash point lower than 93° C., and is accordingly classified into flammable liquids in the GHS categories. In order for a cold and heat storage agent or cold and heat storage agent composition to be classified out of the GHS classification, it is necessary to make the content of normal paraffin in the cold and heat storage agent or cold and heat storage agent composition 10% by mass or less. Moreover, since normal tetradecane (n-C14) is classified into the volatile organic compounds (VOC), which are own restricted substances of Japan Automobile Manufacturers Association, there is a tendency to refrain from using n-C14.

Patent Literatures 2 and 3, for example, disclose the use of a dialkyl ether as a base agent of a heat storage material. Patent Literature 2 discloses a combination of at least one selected from the group consisting of fatty acid esters, aliphatic ketones, fatty acid alcohols, and aliphatic ethers, and a fatty acid metallic salt. Patent Literature 3 discloses a microcapsule in which a compound containing a heteroelement is encapsulated as a heat storage material.

CITATION LIST

Patent Literatures

[Patent Literature 1] Japanese Patent Application Publication No. 2013-166845
[Patent Literature 2] Japanese Patent Application Publication No. 2015-54918
[Patent Literature 3] International Publication No. WO2007/058003

SUMMARY OF INVENTION

An object of the present invention is to provide a cold and heat storage agent composition that does not fall into the GHS categories.

In addition, another object of the present invention is to provide an aluminum-made refrigeration cycle apparatus comprising: the cold and heat storage agent composition of the present invention encapsulated therein.

As a result of earnestly studying in order to achieve the above objects, the present inventors have found a cold and heat storage agent composition that does not fall into the GHS categories by combining a specific dialkyl ether and a specific normal paraffin. Specifically, the present invention provides a cold and heat storage agent composition and an aluminum-made refrigeration cycle apparatus comprising: a cold and heat storage agent composition encapsulated therein as follows.

1. A cold and heat storage agent composition comprising:
   (A) a dialkyl ether; and
   (B) a normal paraffin, wherein
   the (A) contains a dialkyl ether having a straight chain alkyl group,
   the (B) contains a normal paraffin having 16 to 20 carbon atoms, and a content of the normal paraffin having 16 to 20 carbon atoms is 3.0% by mass or more and less than 10.0% by mass based on a total mass of the composition, and
   a melting point and a freezing point of the composition measured by DSC are within a range of −13.0° C. to +12.4° C.
2. The cold and heat storage agent composition according to the above 1, wherein a latent heat of melting per volume of the cold and heat storage agent composition is 125 KJ/L or more.
3. The cold and heat storage agent composition according to the above 1 or 2, wherein a flash point of the cold and heat storage agent composition is 93° C. or more.
4. The cold and heat storage agent composition according to any one of the above 1 to 3, wherein the (A) contains a dialkyl ether having two straight chain alkyl groups each having 6 to 12 carbon atoms.
5. The cold and heat storage agent composition according to any one of the above 1 to 4, wherein the (A) is a dialkyl ether having two straight chain alkyl groups each having 8 to 10 carbon atoms.
6. The cold and heat storage agent composition according to any one of the above 1 to 5, further comprising (C) a hydrogen generation inhibitor.
7. The cold and heat storage agent composition according to the above 6, wherein the (C) is at least one selected from the group consisting of amine salts, sulfonates, phosphate esters, and mixtures of these.
8. The cold and heat storage agent composition according to any one of the above 1 to 7, further comprising (D) an antioxidant.
9. The cold and heat storage agent composition according to any one of the above 1 to 8, further comprising (E) at least one thickener selected from the group consisting of urea compounds, urethane compounds, carbon black, bentonite, and fumed silica.
10. An aluminum-made refrigeration cycle apparatus comprising the cold and heat storage agent composition according to any one of the above 1 to 9 encapsulated therein.

The present invention makes it possible to provide a cold and heat storage agent composition that does not fall into the GHS categories.

DETAILED DESCRIPTION OF EMBODIMENTS

Base Agent

The above component (A) and component (B) are a base agent of a cold and heat storage agent composition of the present invention.

The component (A) contains a dialkyl ether having a straight chain alkyl group, preferably contains a dialkyl ether having two straight chain alkyl groups each having 6 to 12 carbon atoms, and more preferably is at least one selected from the group consisting of dialkyl ethers each having two straight chain alkyl groups each having 8 to 10 carbon atoms. One dialkyl ether may be used alone, or two or more dialkyl ethers may be used in combination as appropriate. The percentage of the (A) dialkyl ether is preferably 60% by mass or more, more preferably 70% by mass or more, and particularly preferably 80% by mass or more, based on the total mass of the composition. It is preferable that the (A) dialkyl ether be contained in such an amount because sufficient solid-liquid latent heat can be obtained.

The component (B) contains a normal paraffin having 16 to 20 carbon atoms, and the content of the normal paraffin having 16 to 20 carbon atoms is 3.0% by mass or more and less than 10.0% by mass based on the total mass of the composition. If the content of the normal paraffin is 10% by mass or more, the cold and heat storage agent composition falls into Category 1 of the GHS classification, a concern arises about the safety to the human bodies. If the content of the normal paraffin is less than 3.0% by mass, the melting point becomes +12.4° C. or more, which makes it impossible to sufficiently cool down a blow air into a vehicle cabin with a cooler, so that the cold and heat storage agent becomes unsuitable. The content of the normal paraffin is preferably 5.0 to 9.5% by mass. The component (B) preferably consists only of a normal paraffin having 16 to 20 carbon atoms, and more preferably consists only of a normal paraffin having 16 to 18 carbon atoms. One component (B) may be used alone, or two or more components (B) may be used in combination as appropriate.

It is most preferable that the (A) be at least one selected from the group consisting of dialkyl ethers each having two straight chain alkyl groups each having 8 or 10 carbon atoms and the (B) be only a normal paraffin having 16 or 17 carbon atoms, or that the (A) be a dialkyl ether having two straight chain alkyl groups each having 8 carbon atoms and the (B) be only a normal paraffin having 16 or 17 carbon atoms, or that the (A) be a dialkyl ether having two straight chain alkyl groups each having 10 carbon atoms and the (B) be only a normal paraffin having 16 or 17 carbon atoms.

The melting point and the freezing point of the composition of the present invention measured by DSC are within a range of −13.0° C. to +12.4° C. The cold and heat storage agent composition of the present invention can be used within this range.

The range is preferably two temperature ranges of −13.0° C. to −3.0° C. and +3.0° C. to +12.4° C. These two temperature ranges are conceivable temperature ranges of two different refrigeration cycle apparatuses. If the melting point and the freezing point are out of these temperature ranges, there is a possibility that a sufficient cold storage performance cannot be obtained.

The cold and heat storage agent is placed into a container, and is managed in accordance with the volume. For this reason, the performance of the cold and heat storage agent is evaluated in accordance with latent heat per capacity (KJ/L), which is obtained by multiplying the latent heat per weight (J/g) by the density. While the latent heat of melting of a normal paraffin having 15 carbon atoms, which is currently used as a cold and heat storage agent, is 125 KJ/L, the latent heat of melting per volume of the composition of the present invention is at least 125 KJ/L. The latent heat of melting of the composition of the present invention is preferably 130 KJ/L or more, and more preferably 140 KJ/L or more. Hence, the composition of the present invention can have significantly high latent heat of melting as compared with the conventional cold and heat storage agent.

The flash point of the composition of the present invention may be 93° C. or more when measured by the Cleveland open cup method specified by JIS K 2265.4. When the flash point is 93° C. or more, the composition falls out of the category of flammable liquids of the GHS classification. The flash point of the composition of the present invention is preferably 130° C. or more, and more preferably 140° C. or more.

The acid value of the composition of the present invention may be 2.0 or less when measured by the method specified by JIS K 2501.5. When the acid value is 2.0 or less, it is possible to suppress degradation of the composition and generation of hydrogen due to decomposition. The acid value of the composition of the present invention is preferably 1.7 or less, and more preferably 1.5 or less.

The cold storage agent or cold and heat storage agent is normally encapsulated in a refrigeration cycle apparatus made of aluminum for use. When the cold storage agent or cold and heat storage agent comes into contact with the refrigeration cycle apparatus, aluminum ions are generated in some cases. If the concentration of aluminum ions thus generated increases, the refrigeration cycle apparatus rusts, or hydrogen is generated to deform the refrigeration cycle apparatus.

On the assumption that the cold and heat storage agent composition of the present invention is encapsulated in a refrigeration cycle apparatus made of aluminum, if an aluminum piece having a predetermined size placed in a sample vial containing the same amount of distilled water as the composition of the present invention has not been decolorized after being left to stand under predetermined conditions, the Al ion concentration of the water layer is normally 1.00 ppm or less. The Al ion concentration is preferably 0.5 ppm or less, and further preferably 0.11 ppm or less. This makes it possible to prevent the refrigeration cycle apparatus made of aluminum from rusting or the refrigeration cycle apparatus made of aluminum from deforming due to the generation of hydrogen.

The amount of the composition of the present invention evaporated and reduced at 50° C. after 72 hours is normally 15% by mass or less, and preferably 10% by mass or less. If the amount evaporated and reduced is large, the possibility that the aluminum case deforms becomes high. For this reason, it is desirable that the amount evaporated and reduced is small. Note that 50° C. is a temperature on the assumption that the composition of the present invention is used near a car air-conditioner in midsummer.

(C) Hydrogen Generation Inhibitor

The cold and heat storage agent composition of the present invention may further contain a hydrogen generation inhibitor. The hydrogen generation inhibitor that can be used in the present invention is preferably at least one selected from the group consisting of amine salts, sulfonates, phosphate esters, and mixtures of these. These compounds are normally used as organic inhibitors (oil-soluble rust inhibitors) or passivators.

The above amine salts include fatty acid amine salts, aromatic carboxylic acid amine salts, phosphoric ester amine salts, and the like. A fatty acid amine salt is preferable.

The fatty acids contained in the above fatty acid amine salts are preferably fatty acids having 4 to 22 carbon atoms, and further preferably fatty acids having 8 to 18 carbon atoms. The fatty acid may be a saturated fatty acid or an unsaturated fatty acid, and further may be a linear fatty acid, a branched fatty acid, a cyclic fatty acid, or a hydroxy fatty acid. Specifically, the fatty acid includes stearic acid, palmitic acid, myristic acid, lauric acid, isostearic acid, octylic acid, undecylenic acid, oleic acid, hydroxystearic acid, and the like. Among these, octylic acid and oleic acid are preferable.

The amines contained in the above fatty acid amine salts are not particularly limited, but are preferably saturated or unsaturated amines having 1 to 42 carbon atoms, and further preferably saturated or unsaturated amines having 4 to 22 carbon atoms. Specifically, the amines include octylamine, laurylamine, myristylamine, stearylamine, behenylamine, oleylamine, tallow alkylamine, hardened tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamine, dimethyl hardened tallow alkylamine, dimethyloleylamine, and the like. Among these, hardened tallow alkylamine and tributylamine are preferable.

One of the above fatty acid amine salts may be used alone or two or more of these may be used in combination. In particular, a fatty acid amine salt obtainable from octylic acid and tributylamine, a fatty acid amine salt obtainable from oleic acid and hardened tallow alkylamine, or a mixture of these is preferable.

The above aromatic carboxylic acid amine salts include ammonium benzoate and the like.

The amines contained in the above phosphoric ester amine salts are, specifically, preferably tertiary alkylamines, aromatic amines, and the like.

The sulfonic acid components of the above sulfonates include, for example, petroleum sulfonic acid, alkyl naphthalene sulfonic acid, alkyl benzenesulfonic acid, and the like, and are composed of amine salts, metallic salts, and the like. Metallic salts are preferable. The amine salts include ammonium salts, diethylenetriamine salts, ethylenediamine salts, and the like. The metallic salts include, for example, calcium salts, magnesium salts, sodium salts, potassium salts, lithium salts, zinc salts, and the like. The preferable salts are calcium salts, sodium salts, and zinc salts. In particular, zinc salts are preferable. One of the above sulfonates may be used alone or two or more of these may be used in combination.

The phosphate esters contained in the above phosphoric ester amine salts include acid phosphates, orthophosphates, and the like. Acid phosphates are preferable.

The acid phosphates include, specifically, methyl acid phosphate, butyl acid phosphate, dibutyl phosphate, monobutyl phosphate, 2-ethylhexyl acid phosphate, isodecyl acid phosphate, monoisodecyl phosphate, and the like.

The orthophosphates include, specifically, trimethyl phosphate, triethyl phosphate, tributyl phosphate, tris(2-ethylhexyl)phosphate, triphenyl phosphate, tricresyl phosphate, trixylenyl phosphate, cresyl diphenyl phosphate, 2-ethylhexyl diphenyl phosphate, and the like. One of the above phosphoric ester amine salts may be used alone or two or more of these may be used in combination.

As the hydrogen generation inhibitor, use of a fatty acid amine salt and a phosphate ester in combination, or use of a sulfonic acid metallic salt and a phosphate ester in combination is preferable. In particular, use of a fatty acid amine salt and a phosphate ester in combination is preferable. Among these, it is preferable that the fatty acid amine salt be a salt of a fatty acid having 4 to 22 carbon atoms and a saturated or unsaturated amine having 1 to 42 carbon atoms, a fatty acid amine salt obtainable from octylic acid and tributylamine, a fatty acid amine salt obtainable from oleic acid and hardened tallow alkylamine, or a mixture of these, and the phosphate ester be an acid phosphate selected from the group consisting of methyl acid phosphate, butyl acid phosphate, dibutyl phosphate, monobutyl phosphate, 2-ethylhexyl acid phosphate, isodecyl acid phosphate, and monoisodecyl phosphate.

The ratio (mass ratio) of the fatty acid amine salt and the phosphate ester is preferably 10:90 to 90:10, more preferably 25:75 to 75:25, and further preferably 40:60 to 60:40.

The hydrogen generation inhibitor is preferably contained in such an amount that does not affect the latent heat of melting of the base agent. Specifically, the total amount of the hydrogen generation inhibitor is preferably 0.01% by mass to 10.0% by mass, more preferably 0.05% by mass to 5.0% by mass, further preferably 0.1% by mass to 3.0% by mass, and further particularly preferably 0.1 to 1.0% by mass based on the total mass of the composition.

Additive

To the cold and heat storage agent composition of the present invention, an additive that is normally used for cold and heat storage agents may be added in such an amount that does not affect the latent heat of melting of the base agent. Specifically, such an additive includes an antioxidant and the like.

As the antioxidant, phenolic antioxidants and amine antioxidants are preferable, and phenolic antioxidants are more preferable.

The phenolic antioxidants include 2,6-di-t-butyl-p-cresol (BHT), 2,2'-methylenebis(4-methyl-6-t-butylphenol), 4,4'-butylidenebis(3-methyl-6-t-butylphenol), 2,6-di-t-butylphenol, 2,4-dimethyl-6-t-butylphenol, tertiary butyl hydroxyanisole (BHA), 4,4'-butylidenebis(3-methyl-6-t-butylphenol), 4,4'-methylenebis(2,3-di-t-butylphenol), 4,4'-thiobis(3-methyl-6-t-butylphenol), and the like. Among these, 2,6-di-t-butyl-phenol is preferable.

The amine antioxidants include N-n-butyl-p-aminophenol, alkyl diphenylamine, a-naphthylamine, N-phenyl-α-naphthylamine, and phenothiazine. Among these, alkyl diphenylamine is preferable, and dioctyldiphenylamine is particularly preferable. One of the above antioxidants may be used alone or two or more of these may be used in combination.

The total amount of the antioxidant added may be such an amount that does not affect the latent heat of melting of the base agent, but is preferably 0.01% by mass to 10% by mass, more preferably 0.05% by mass to 5% by mass, and further preferably 0.1% by mass to 0.9% by mass, based on the total mass of the composition.

(E) Thickener

The cold and heat storage agent composition of the present invention may be made into a grease by adding a thickener thereto. The thickener that can be used in the present invention is at least one selected from the group consisting of urea compounds, urethane compounds, carbon black, bentonite, and fumed silica.

The urea compounds include, for example, diurea compounds represented by the following formula (1):

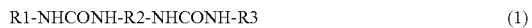

R1-NHCONH-R2-NHCONH-R3    (1)

wherein R1 and R3 may be the same or different, and each represent a hydrocarbon group having 4 to 20 carbon atoms, and are each, for example, an aliphatic hydrocarbon group, an alicyclic hydrocarbon group, or an aromatic hydrocarbon group, and R2 represents an aromatic hydrocarbon group having 6 to 15 carbon atoms.

The diurea compound can be obtained, for example, by reacting an aromatic diisocyanate with an aromatic amine, an aliphatic amine, an alicyclic amine, or a mixture of two or more of these in a base oil.

Specific examples of the aromatic diisocyanate include tolylene diisocyanate, diphenylmethane diisocyanate, naphthalene diisocyanate, and the like. Specific examples of the aromatic amine include p-toluidine, aniline, naphthylamine, and the like. Specific example of the aliphatic amine include octylamine, nonylamine, decylamine, undecylamine, dodecylamine, tridecylamine, tetradecylamine, pentadecylamine, hexadecylamine, heptadecylamine, octadecylamine, nonyldecylamine, eicosylamine, and the like. Specific examples of the alicyclic amine include cyclohexylamine and the like. Among these, a diurea compound (an aliphatic diurea compound, an alicyclic diurea compound, or an alicyclic aliphatic diurea compound) obtainable from an aromatic diisocyanate and an aliphatic amine, an alicyclic amine, or a mixture of these is preferable. In particular, a urea compound obtainable from diphenylmethane diisocyanate, as the aromatic diisocyanate, and octadecylamine, cyclohexylamine, or a mixture of these, as the aliphatic amine, the alicyclic amine, or the mixture of these, is preferable.

The urethane compound is obtained by reacting the above diisocyanate and a monovalent alcohol having 4 to 20 carbon atoms in a base oil.

The fumed silica is desirably fumed silica whose primary particles have an average particle size of preferably 0.1 μm or less, and further preferably 0.05 μm or less. Fumed silica in which terminals are hydrophobized with dimethyl, trimethyl, octyldimethylpolysiloxane, or the like is preferable. The thickener is preferably a thickener characterized to be added by a milling process at 80° C. or less. In a case where the flash point of the base agent is low, when a reaction step or a heating of 80° C. or more is conducted, the risk in terms of steps increases.

Carbon black and fumed silica that allow a base agent to be made into a grease with a small amount thereof are preferable from the viewpoint of not affecting the latent heat of melting of the base agent. A thickener selected from the group consisting of carbon black and hydrophobized fumed silica is preferable from the viewpoint of anti-aluminum properties.

The content of the thickener is favorably an amount that makes the worked penetration of the grease around 200 to 400, and is normally 1 to 30% by mass, and preferably 3 to 20% by mass.

EXAMPLES

Preparation of Cold And Heat Storage Agent Composition

Cold and heat storage agent compositions of Examples and Comparative Examples were produced as follows: Substances shown in Table 1 to Table 3 (in Tables, numerical values for (A) to (E) are % by mass based on the total mass of the composition) were loaded into a beaker, and heated to 50° C. and agitated, and after it was confirmed that the substances were dissolved, the compositions were naturally cooled down to room temperature.

The compositions made into greases were each prepared by adding a thickener to the cold and heat storage agent composition after the natural cooling, and thereafter subjecting the resultant to a triple roll at room temperature.

Each cold and heat storage agent composition thus obtained was tested by methods shown below. Results are also shown in Table 1 to Table 3.

Test Methods

Melting Point, Freezing Point, and Amount of Latent Heat
the melting point, the freezing point, and the amount of latent heat of each cold and heat storage agent composition were measured using a differential scanning calorimeter (DSC: DSC Q2000 manufactured by TA Instruments). The measurement was conducted by a method that cooled down about 5 mg of the sample to −30° C. or −20° C. at a speed of 5° C./min, and then heated the sample to 40° C. at a speed of 5° C./min. The extrapolation melting start temperature of the melting peak was measured as a melting point, and the extrapolation crystallization start temperature of the initial crystallization peak was measured as a freezing point. The amount of latent heat per weight (solid-liquid latent heat J/g) was calculated from the area of the melting peak, and the amount of heat per capacity was calculated by multiplying the amount of latent heat per weight by the density. Since the latent heat to be used depends on the volume in the container, the amount of latent heat per capacity (solid-liquid latent heat KJ/L) was calculated.

Density g/cm³ (15° C.)
measured in accordance with JIS K 2249

Flash Point (° C.)
measured in accordance with JIS K 2265-4 (Cleveland open cup method (abbreviated as "COC"))

Acid Value mgKOH/g
measured in accordance with JIS K 2501.5

Al Ion Concentration
(1) 8.5 ml of each of the cold and heat storage agent compositions of Examples and Comparative Examples was placed into a sample vial.
(2) Next, an aluminum piece of 40×12 mm was placed into the sample vial.
(3) Lastly, 8.5 ml of distilled water was placed into the sample vial (cold and heat storage agent: distilled water=1:1 (volume ratio)). Once the resultant was left to stand after the addition of distilled water, the resultant separated into two layers in accordance with specific gravities because of the insolubility (in the case where no thickener is added, the lower layer is of distilled water and the upper layer is of the cold and heat storage agent composition, while in the case where the thickener is added, the lower layer is of the cold and heat storage agent composition and the upper layer is of distilled water).
(4) The lid of the sample vial was closed, and after the sample vial was left to stand in a constant temperature oven at 90° C. for 72 h, whether the surface of the aluminum piece rusted or not was visually observed. The aluminum piece with no rust was regarded as acceptable. The water layer was sampled with a syringe, and the concentration of aluminum ions eluted in pure water was measured by an ICP analysis. The ICP analysis was performed in accordance with JIS K 0116: general rules for atomic emission spectrometry.

Amount Evaporated and Reduced

About 50 g of each cold and heat storage agent composition was placed into a 100-ml beaker, and weighed, after the 100-ml beaker was left to stand in a constant temperature oven at 50° C. for 72 h, the amount reduced was divided by the mass before the test, the resultant was represented by a quotient as the amount evaporated and reduced.

60-Stroke Unworked Penetration measured in accordance with JIS K 2220 7.

TABLE 1

|  | Component | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| (A) Dialkyl ether | Octyl ether | 100 | 99.0 | 0 | 0 | 89.1 | 89.1 | 89.1 |
|  | Decyl ether | 0 | 0 | 0 | 0 | 0 | 0 | 0 |
| (B) Normal paraffin | Normal dodecane | 0 | 0 | 99.0 | 0.0 | 9.9 | 0 | 0 |
|  | Normal tridecane | 0 | 0 | 0 | 99.0 | 0 | 9.9 | 0 |
|  | Normal pentadecane | 0 | 0 | 0 | 0.0 | 0 | 0 | 9.9 |
|  | Normal hexadecane | 0 | 0 | 0 | 0.0 | 0 | 0 | 0 |
|  | Normal heptadecane | 0 | 0 | 0 | 0.0 | 0 | 0 | 0 |
|  | Normal octadecane | 0 | 0 | 0 | 0.0 | 0 | 0 | 0 |
| (C) Hydrogen generation inhibitor | Fatty acid amine salt | 0 | 0.4 | 0.4 | 0.4 | 0.4 | 0.4 | 0.4 |
|  | Phosphate | 0 | 0.4 | 0.4 | 0.4 | 0.4 | 0.4 | 0.4 |
| (D) Antioxidant | Phenolic antioxidant | 0 | 0.2 | 0.2 | 0.2 | 0.2 | 0.2 | 0.2 |
| (E) Thickener | Hydrophobic silica | 0 | 0 | 0 | 0 | 0 | 0 | 0 |
|  | Carbon black | 0 | 0 | 0 | 0 | 0 | 0 | 0 |
|  | Test methods | — | — | — | — | — | — | — |
| Freezing point (° C.) | DSC | −13.5 | −14.0 | −11.4 | −7.1 | −18.5 | −15.7 | −13.5 |
| Melting point (° C.) |  | −8.5 | −9.5 | −13.9 | −6.6 | −14.3 | −14.2 | −10.1 |
| Solid-liquid latent heat (J/g) |  | 189 | 188 | 209 | 146 | 141 | 144 | 182 |
| Solid-liquid latent heat (KJ/L) |  | 148 | 152 | 157 | 111 | 114 | 117 | 147 |
| Density (g/cm³@15° C.) | JIS K 2249 | 0.81 | 0.81 | 0.75 | 0.76 | 0.81 | 0.81 | 0.81 |
| Flash point (° C.) | JIS K 2265.4 | 137 | 141 | 86 | 102 | 132 | 132 | 142 |
| Acid value (mgKOH/g) | JIS K 2501.5 | ≤0.1 | 1.3 | 1.3 | 1.3 | 1.3 | 1.3 | 1.3 |
| AL concentration (ppm) | 90° C., 72 h | 4.13 | ≤0.01 | ≤0.01 | ≤0.01 | — | — | — |
| Evaporation loss (mass %) | 50° C., 72 h | 0.1 | 0.9 | 21.6 | 16.1 | 2.7 | 1.0 | 1.2 |
| Unworked penetration | JIS K 2220.7 | — | — | — | — | — | — | — |

TABLE 2

|  | Component | Ex. 1 | Ex. 2 | Ex. 3 | Ex. 4 | Ex. 5 | Ex. 6 | Ex. 7 |
|---|---|---|---|---|---|---|---|---|
| (A) Dialkyl ether | Octyl ether | 89.1 | 89.1 | 89.1 | 89.5 | 80.5 | 76.0 | 80.6 |
|  | Decyl ether | 0 | 0 | 0 | 0 | 0 | 0 | 0 |
| (B) Normal paraffin | Normal dodecane | 0 | 0 | 0 | 0 | 0 | 0 | 0 |
|  | Normal tridecane | 0 | 0 | 0 | 0 | 0 | 0 | 0 |
|  | Normal pentadecane | 0 | 0 | 0 | 0 | 0 | 0 | 0 |
|  | Normal hexadecane | 9.9 | 0 | 0 | 0 | 0 | 0 | 0 |
|  | Normal heptadecane | 0 | 9.9 | 0 | 9.5 | 8.5 | 8.0 | 8.5 |
|  | Normal octadecane | 0 | 0 | 9.9 | 0 | 0 | 0 | 0 |
| (C) Hydrogen generation inhibitor | Fatty acid amine salt | 0.4 | 0.4 | 0.4 | 0.4 | 0.4 | 0.4 | 0.4 |
|  | Phosphate | 0.4 | 0.4 | 0.4 | 0.4 | 0.4 | 0.4 | 0.4 |
| (D) Antioxidant | Phenolic antioxidant | 0.2 | 0.2 | 0.2 | 0.2 | 0.2 | 0.2 | 0.2 |
| (E) Thickener | Hydrophobic silica | 0 | 0 | 0 | 0 | 10.0 | 13.0 | 0 |
|  | Carbon black | 0 | 0 | 0 | 0 | 0 | 0 | 10.0 |
|  | Test methods | — | — | — | — | — | — | — |
| Freezing point (° C.) | DSC | −12.6 | −7.7 | −5.4 | −7.4 | −7.8 | −6.9 | −7.5 |
| Melting point (° C.) |  | −9.5 | −9.4 | −11.5 | −9.5 | −10.1 | −10.5 | −9.3 |
| Solid-liquid latent heat (J/g) |  | 183 | 185 | 156 | 188 | 160 | 154 | 158 |
| Solid-liquid latent heat (KJ/L) |  | 148 | 149 | 127 | 152 | 136 | 136 | 137 |
| Density (g/cm³@15° C.) | JIS K 2249 | 0.81 | 0.81 | 0.81 | 0.81 | 0.85 | 0.88 | 0.87 |
| Flash point (° C.) | JIS K 2265.4 | 146 | 140 | 152 | 146 | 146 | 146 | 146 |
| Acid value (mgKOH/g) | JIS K 2501.5 | 1.3 | 1.3 | 1.2 | 1.3 | 1.3 | 1.3 | 1.3 |
| AL concentration (ppm) | 90° C., 72 h | ≤0.01 | ≤0.01 | ≤0.01 | ≤0.01 | ≤0.01 | ≤0.01 | ≤0.01 |
| Evaporation loss (mass %) | 50° C., 72 h | 0.6 | 0.9 | 0.5 | 0.4 | 0.4 | 0.4 | 0.4 |
| Unworked penetration | JIS K 2220.7 | — | — | — | — | 440 | 390 | 216 |

TABLE 3

|  | Component | Comp. Ex. 8 | Comp. Ex. 9 | Ex. 8 | Ex. 9 | Ex. 10 | Ex. 11 | Comp. Ex. 10 |
|---|---|---|---|---|---|---|---|---|
| (A) Dialkyl ether | Octyl ether | 0 | 0 | 0 | 0 | 0 | 0 | 0 |
|  | Decyl ether | 100.0 | 99.0 | 89.1 | 89.1 | 89.1 | 94.1 | 96.0 |

TABLE 3-continued

| | Component | Comp. Ex. 8 | Comp. Ex. 9 | Ex. 8 | Ex. 9 | Ex. 10 | Ex. 11 | Comp. Ex. 10 |
|---|---|---|---|---|---|---|---|---|
| (B) Normal paraffin | Normal dodecane | 0 | 0 | 0 | 0 | 0 | 0 | 0 |
| | Normal tridecane | 0 | 0 | 0 | 0 | 0 | 0 | 0 |
| | Normal pentadecane | 0 | 0 | 0 | 0 | 0 | 0 | 0 |
| | Normal hexadecane | 0 | 0 | 9.9 | 0 | 0 | 4.9 | 3.0 |
| | Normal heptadecane | 0 | 0 | 0 | 9.9 | 0 | 0 | 0 |
| | Normal octadecane | 0 | 0 | 0 | 0 | 9.9 | 0 | 0 |
| (C) Hydrogen generation inhibitor | Fatty acid amine salt | 0 | 0.4 | 0.4 | 0.4 | 0.4 | 0.4 | 0.4 |
| | Phosphate | 0 | 0.4 | 0.4 | 0.4 | 0.4 | 0.4 | 0.4 |
| (D) Antioxidant | Phenolic antioxidant | 0 | 0.2 | 0.2 | 0.2 | 0.2 | 0.2 | 0.2 |
| (E) Thickener | Hydrophobic silica | 0 | 0 | 0 | 0 | 0 | 0 | 0 |
| | Carbon black | 0 | 0 | 0 | 0 | 0 | 0 | 0 |
| | Test methods | — | — | — | — | — | — | — |
| Freezing point (° C.) | DSC | 13.0 | 11.6 | 8.8 | 7.2 | 6.7 | 11.7 | 10.7 |
| Melting point (° C.) | | 14.2 | 13.2 | 9.6 | 9.8 | 9.5 | 11.7 | 12.5 |
| Solid-liquid latent heat (J/g) | | 209 | 206 | 206 | 199 | 200 | 205 | 206 |
| Solid-liquid latent heat (KJ/L) | | 170 | 169 | 168 | 163 | 163 | 168 | 169 |
| Density (g/cm$^3$@15° C.) | JIS K 2249 | 0.82 | 0.82 | 0.82 | 0.82 | 0.82 | 0.82 | 0.82 |
| Flash point (° C.) | JIS K 2265.4 | 180 | 174 | 174 | 182 | 180 | 184 | 176 |
| Acid value (mgKOH/g) | JIS K 2501.5 | ≤0.1 | 1.1 | 1.2 | 1.3 | 1.3 | 1.3 | 1.3 |
| AL concentration (ppm) | 90° C., 72 h | 1.23 | ≤0.01 | ≤0.01 | ≤0.01 | ≤0.01 | ≤0.01 | ≤0.01 |
| Evaporation loss (mass %) | 50° C., 72 h | 0.1 | ≤0.1 | 0.1 | 0.7 | ≤0.1 | 0.1 | ≤0.1 |
| Unworked penetration | JIS K 2220.7 | — | — | — | — | — | — | — |

Fatty acid amine salt: a mixture of octylic acid tributylamine salt and oleic acid hardened tallow alkylamine (C-18 main) salt Phosphate: acid phosphate, isodecyl acid phosphate

What is claimed is:

1. A cold and heat storage agent composition consisting of:
    a base agent consisting of:
        (A) a single dialkyl ether; and
        (B) a single linear paraffin, wherein the (A) contains a dialkyl ether having two straight chain alkyl group, each alkyl group containing 8 carbon atoms,
    the (B) consists of a linear paraffin having 16 carbon atoms, and a content of the linear paraffin having 16 carbon atoms is 3.0% by mass or more and less than 10.0% by mass based on a total mass of the composition, and
    a melting point and a freezing point of the composition measured by DSC are within a range of −13.0° C. to +12.4° C., and
    optional additives consisting of:
        (C) a hydrogen generation inhibitor,
        (D) an antioxidant,
        (E) at least one thickener.

2. The cold and heat storage agent composition according to claim 1, wherein the (C) is at least one selected from the group consisting of amine salts, sulfonates, phosphate esters, and mixtures of these.

3. The cold and heat storage agent composition according to claim 1, wherein the (E) is selected from the group consisting of urea compounds, urethane compounds, carbon black, bentonite, and fumed silica.

4. An aluminum-made refrigeration cycle apparatus comprising the cold and heat storage agent composition according to claim 1 encapsulated therein.

5. A cold and heat storage agent composition consisting of:
    a base agent consisting of:
        (A) a single dialkyl ether; and
        (B) a single linear paraffin, wherein
    the (A) contains a dialkyl ether having two straight chain alkyl group, each alkyl group containing 10 carbon atoms,
    the (B) consists of a linear paraffin having 17 carbon atoms, and a content of the linear paraffin having 17 carbon atoms is 3.0% by mass or more and less than 10.0% by mass based on a total mass of the composition, and
    a melting point and a freezing point of the composition measured by DSC are within a range of −13.0° C. to +12.4° C., and
    optional additives consisting of:
        (C) a hydrogen generation inhibitor,
        (D) an antioxidant,
        (E) at least one thickener.

6. The cold and heat storage agent composition according to claim 5, wherein the (C) is at least one selected from the group consisting of amine salts, sulfonates, phosphate esters, and mixtures of these.

7. The cold and heat storage agent composition according to claim 5, wherein the (E) is selected from the group consisting of urea compounds, urethane compounds, carbon black, bentonite, and fumed silica.

8. An aluminum-made refrigeration cycle apparatus comprising the cold and heat storage agent composition according to claim 5 encapsulated therein.

* * * * *